US011847416B2

(12) United States Patent
Kadam et al.

(10) Patent No.: US 11,847,416 B2
(45) Date of Patent: Dec. 19, 2023

(54) SYSTEMS AND METHODS FOR CONVERTING AN INPUT CONTENT ITEM BASED ON CONTEXTS

(71) Applicant: Rovi Guides, Inc., San Jose, CA (US)

(72) Inventors: Lakhan Tanaji Kadam, Maharashtra (IN); Srishti Sharma, Bihar (IN)

(73) Assignee: Rovi Guides, Inc., San Jose, CA (US)

( * ) Notice: Subject to any disclaimer, the term of this patent is extended or adjusted under 35 U.S.C. 154(b) by 154 days.

(21) Appl. No.: 17/108,180

(22) Filed: Dec. 1, 2020

(65) Prior Publication Data

US 2022/0171939 A1    Jun. 2, 2022

(51) Int. Cl.
*G06F 40/00* (2020.01)
*G06F 40/295* (2020.01)
*G10L 15/26* (2006.01)
*G06F 40/35* (2020.01)

(52) U.S. Cl.
CPC ............ *G06F 40/295* (2020.01); *G06F 40/35* (2020.01); *G10L 15/26* (2013.01)

(58) Field of Classification Search
CPC ...... G06F 40/295; G06F 40/35; G06F 40/253; G06F 40/279; G06F 40/284; G06F 40/56; G06F 40/47; G06F 40/51; G06F 40/55; G06F 40/58; G06F 40/263; G06F 9/454; G06F 16/173; G10L 15/26; G06Q 10/00
See application file for complete search history.

(56) References Cited

U.S. PATENT DOCUMENTS

| 7,657,421 | B2 * | 2/2010 | Barnes | G06F 40/151 |
| | | | | 704/4 |
| 9,245,278 | B2 * | 1/2016 | Orsini | G06Q 50/01 |
| 9,916,307 | B1 * | 3/2018 | Kochura | G06N 5/02 |
| 2012/0259617 | A1 * | 10/2012 | Indukuri | G06F 40/279 |
| | | | | 704/9 |
| 2017/0277682 | A1 * | 9/2017 | Fink | G06F 40/253 |
| 2018/0089172 | A1 * | 3/2018 | Needham | H04L 67/306 |
| 2018/0329894 | A1 * | 11/2018 | Zhao | G06F 40/51 |
| 2018/0373691 | A1 * | 12/2018 | Alba | G06F 40/253 |

OTHER PUBLICATIONS

Kundi FM, Ahmad S, Khan A, Asghar MZ. Detection and scoring of internet slangs for sentiment analysis using SentiWordNet. Life Science Journal. May 2014; 11(9):66-72. (Year: 2014).*

* cited by examiner

*Primary Examiner* — Douglas Godbold
*Assistant Examiner* — Parker Mayfield
(74) *Attorney, Agent, or Firm* — HALEY GUILIANO LLP (57) ABSTRACT

Methods and systems for converting an input content item into an output content item to enhance comprehension of the message by an interlocutor, based on contexts. For example, the conversion may occur in any message service: when an interlocutor writes a message in English (or any other language), he or she might include a regional dialect (purposively or not), such as a piece of slang, that the other interlocutors may not understand, although they all generally write and understand English. In such circumstances, the regional dialect is identified and replaced with either a more globalized word or with another linguistic regionalism that is understandable for the intended interlocutor.

20 Claims, 7 Drawing Sheets

| Input content item | "She bunked the class yesterday, she was chumming" |

404

| Identified entities | "She bunked the class yesterday, she was chumming" |

KG

406

| Entity | <Meaning, context of the entity> | |
|---|---|---|
| Bunk | <sleep in an improvised bed, USA> | <skip, India> |
| Class | <set of common things, World> | <teaching session, World> |
| Chum | <befriend, World> | <menstruate, India> |

FIG. 4A         See FIG. 4B

FIG. 4B

See FIG. 4A

408

| # | Interpretation | Weightage |
|---|---|---|
| 1 | "She slept in an improvised bed the set of common things, she was befriending" | 0.1 |
| 2 | "She slept in an improvised bed the set of common things, she was menstruating" | 0.1 |
| 3 | "She slept in an improvised bed the teaching session, she was befriending" | 0.1 |
| 4 | "She slept in an improvised bed the teaching session, she was menstruating" | 0.1 |
| 5 | "She skipped the set of common things, she was befriending" | 0.3 |
| 6 | "She skipped the set of common things, she was menstruating" | 0.3 |
| 7 | "She skipped the teaching session, she was befriending" | 0.8 |
| 8 | "She skipped the teaching session, she was menstruating" | 0.9 |

| # | Interpretation | Weightage |
|---|---|---|
| 8 | "She skipped the teaching session, she was menstruating" | 0.9 |

412

| Output content item | "She skipped the class, she was menstruating" |
|---|---|

| Entity | <Meaning, context of the entity, *context of the meaning* > | | |
|---|---|---|---|
| Bunk | <sleep in an improvised bed, USA, *World*> | <skip, India, *World*> | |
| Class | <set of common things, World, *World*> | <teaching session, World, *World*> | |
| Chum | <befriend, World, *World*> | <menstruate, India, *World*> | <riding the Cotton Pony, India, *USA*> |

FIG. 6

SYSTEMS AND METHODS FOR CONVERTING AN INPUT CONTENT ITEM BASED ON CONTEXTS

BACKGROUND

With the globalization of goods and services, communications have followed the same trend, and more and more people around the globe are exchanging textual or verbal information. Because translating services are not yet entirely able to translate with sufficient accuracy or because some languages are widely spoken around the world, a common language is usually agreed upon by the participants. However, despite this universalism of language, many regional dialects still exist and sometimes develop over time. Therefore, although all the interlocutors formally write in, speak in and understand the same language (e.g., English), there may be a fraction of the vocabulary that is not shared between them, due to linguistic regionalism. This typically occurs between different countries (e.g., between the US, India, the UK and Australia), but also within countries (e.g., between Edinburgh and London). As a result, if the vast majority of the exchange in a language will be correctly understood by all interlocutors in a conversation, some words, such as slang or idioms, may get lost, at best, or misinterpreted, at worst.

Therefore, any type of means of communication in a same language may contribute to those pitfalls. It is against this background that embodiments of the present invention have arisen.

SUMMARY

There is a need for improved communication services that may improve the comprehension between interlocutors of different regions speaking the same language.

The present disclosure addresses the problems described above, by, for example, providing systems and methods for converting context-based words in a message to enhance comprehension of the message by an interlocutor. For example, the conversion may occur in any message service, such as cellular-based message services (e.g., SMS), Internet-based message services (e.g., email or instant messaging service, or large-audience message service, such as Twitter®), or in any language recognition services (e.g., Dragon® software). When an interlocutor writes a message in English (or any other language), he or she might include a linguistic regionalism, purposely or not, that the other interlocutors may not understand, although they all generally write and understand English. In such circumstances, the regional dialect is identified and replaced with either a more globalized item or with another regionalism that is understandable for the intended interlocutor.

In an implementation, a converting system receives from a first user device (e.g., a laptop of a first user in India) an input content item (e.g., a text message or a voice message) and then identifies, in the input content item, at least one entity (e.g., one or more words or idioms). From a database, the converting system retrieves for each entity one or more meanings of the entity (e.g., a definition or a synonym). In the database, each couple entity-meaning is associated with a local context (e.g., India) or global context (i.e., worldwide) for the entity. For instance, a global context of the entity in the couple entity-meaning means that that specific entity has that specific meaning everywhere, while a local context of the entity in the couple entity-meaning means that that specific entity has that specific meaning only in the specified local context (e.g., India). Using the retrieved meanings, the converting system creates interpretations of the input content item, wherein an interpretation is the input content item in which each identified entity is replaced with one of its retrieved meanings. Then the converting system computes a weightage for each of the possible interpretations. In an example where there are two entities with respectively three meanings and four meanings, the number of interpretations is twelve (three times four). The weightage may take into account a grammatical aspect (e.g., transitive and intransitive verbs) and a semantic aspect of the interpretation (the overall meaning of the sentence). Based on weightages of the interpretations, the converting system selects an interpretation (e.g., that with the highest weightage) and generates for output, to a second user device (e.g., a smartphone of a second user in London), an output content item, wherein the output content item corresponds to the input content item in which at least one entity is replaced by the meaning of the couple entity-meaning in the selected interpretation. Alternatively, the entity is replaced by a synonym of the meaning. To make sure that no entity whose meaning is global in the couple entity-meaning is replaced, the converting system may determine whether, for each couple entity-meaning in the selected interpretation, the couple entity-meaning is associated with a local context of the entity. In response to determining that the couple entity-meaning is associated with a local context of the entity, the converting system performs the replacement; in response to determining that the couple entity-meaning is associated with a global context of the entity, the converting system does not perform the replacement and leaves the entity as it is. This ensures that a word used as local slang (i.e., an entity whose meaning in the couple entity-meaning is associated with a local context) is replaced for another word, and that a word used as a regular word that is understood by anybody around the world speaking the language (i.e., an entity whose meaning in the couple entity-meaning is associated with a global context) is not replaced. The converting system is therefore able to replace slang in a message and to leave regular words (those that are not slang) unchanged.

In some implementations, the converting system may identify a context of the input content item (e.g., India when the first user device is in India), and the weightage of the interpretation depends in part on a correspondence between the context of the input content item and the context of the entity in each couple entity-meaning. Any couple entity-meaning for which the context of the entity (e.g., India) is in, or includes, the context of the input content item may lead to a higher weight for the interpretation including that couple. This is reflecting the fact that, for example, someone from India is more likely to use Indian slang.

In some implementations, the converting system may identify a context of the output content item (e.g., the US when the second user device is in the US).

For example, the converting system may not replace in the output content item an entity by its meaning when the context of the output content item is included in the context of the entity of the couple entity-meaning in the selected interpretation. This allows the converting system to keep UK slang sent by the first user device when the second user device is in London (because London is included in the UK). However, when the second user device is in the US, the converting system does replace the entity by its meaning in the selected interpretation (because the US is not included in the UK).

For example, the database may include meanings that are associated with a local context or a global context. Each couple entity-meaning is therefore associated with a context of the entity and a context of the meaning. The context of the meaning means that the meaning of the entity may be understood only in the associated context. This is in particular applicable when the database contains slang as meanings, such that an entity that is slang in one country may have, as a meaning, slang in another country. To compute the weightage, the converting system may take into account the correspondence between the context of the output content item and the context of the meaning in the couple entity-meaning. In particular, in an interpretation, when the local context of the output content item is not included in the local context of the meaning in the couple entity-meaning, the weightage of the interpretation is decreased. An interpretation where a piece of Indian slang has a piece of UK slang as meaning will have a low weight if the second user device is not in the UK but may have a higher weight if the second user device is in London (included in the UK).

For example, as discussed previously, instead of replacing the entity with a meaning, the converting system may replace the entity with a synonym of the meaning. The choice of the synonym may be determined using the context of the output content item. This allows a piece of Indian slang to be replaced with a piece of UK slang when the second user device is the UK without using a database that includes meaning associated with local contexts (such as slang as meanings for other slangs).

In an implementation, control circuitry may also generate for display the entity of the input content item that was replaced by its meaning or a synonym, so that the second user device receives both pieces of information. This allows the user of the second user device to access the original message in order to learn new words and/or to check if the selected interpretation is appropriate (e.g., grammatically and semantically).

In an implementation, the converting system may generate a request for input about the accuracy of the output content item. The request may be sent to the first user device or to the second user device. In the latter case, the converting system sends the output content item along with the original entity of the replaced entity. The database may be updated based on the response to the request.

Converting mechanisms, techniques and systems are presently introduced to efficiently, swiftly and automatically alter a message to improve the quality of exchanges throughout the world between people speaking the same language but, for instance from different regions or cultures.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 4, split into

DETAILED DESCRIPTION

Methods and systems are disclosed herein to convert an input content item, such as a text message sent via a first user device, into an output content item, such as a text message received on a second user device. The user devices may be smartphones, tablets, laptops, phablets, computers with a display, Smart TVs, video game consoles, etc.

As referred to herein, the term "content item" should be understood to mean an electronically consumable media asset, such as an electronic version of a message, a text message or a voice message, a printed book, electronic television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, articles, newspapers, blogs, advertisements, chat sessions, social media, applications, games, and/or any other media or multimedia and/or combination of the same.

As referred to herein, the term "entity" should be understood to mean a word that needs to be interpreted, such as a word, phrase, or idea.

As referred to herein the term, "context" should be understood to include a geographical region, culture, language, religion, or any suitable subject that is specific to a particular group of people. The context encompasses any characteristics and knowledge of a particular group of people. Most often, in the description, the "context" will refer to a geographical area.

Figure 1:
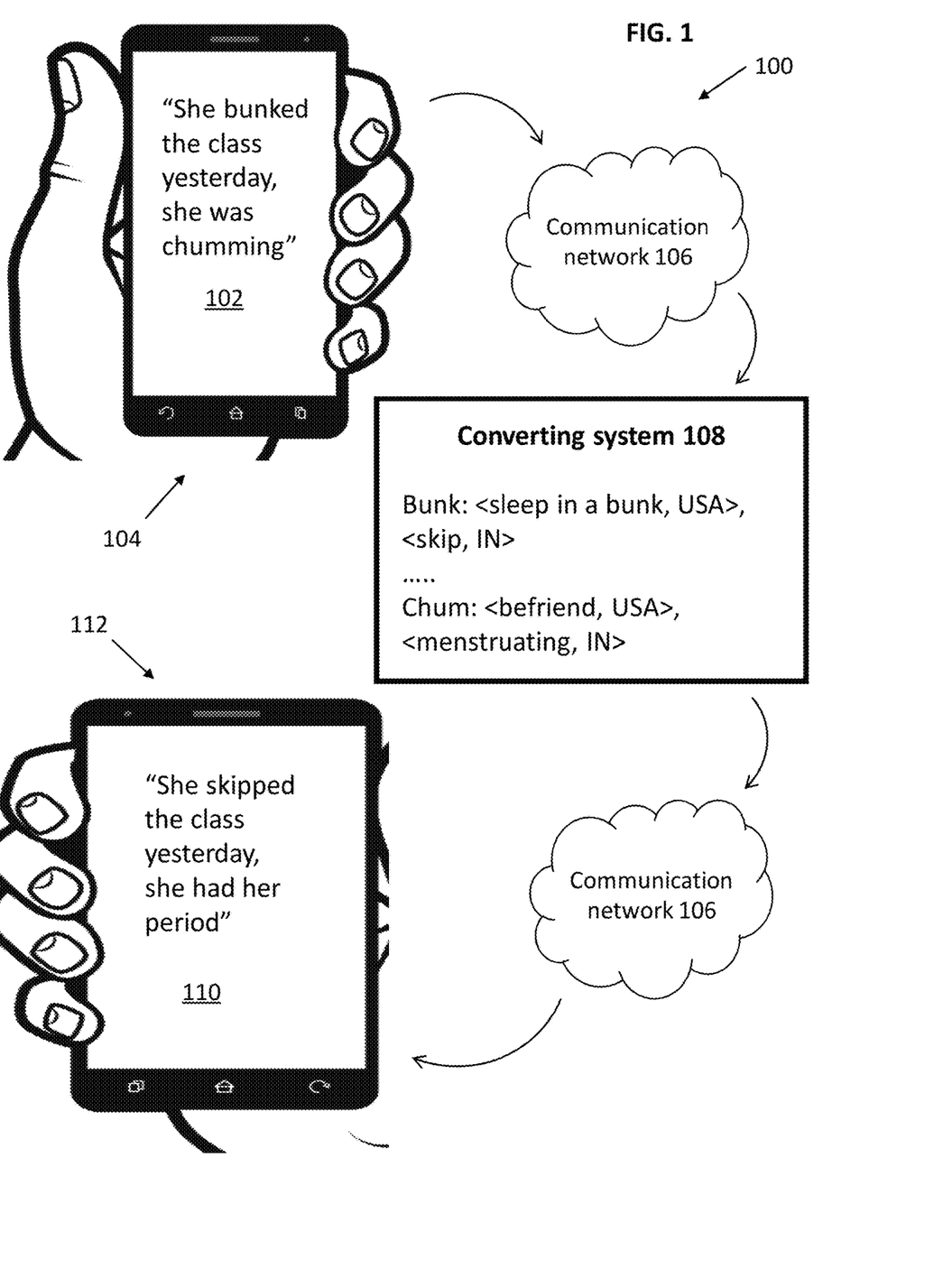
FIG. 1 is an illustrative representation of a situation in which an input content item, as input on a first user device, that contains linguistic regionalisms, is converted into an output content item, as output on a second user device, where the linguistic regionalism of the input content item has been replaced, in accordance with some embodiments of the disclosure.

FIG. 1 shows a representation of a situation 100 where an input content item 102, received from a first user device 104, by means of a communication network 106, and containing the use of at least one regional dialect, is converted by a converting system 108 into an output content item 110, sent to a second user device 112 by means of the communication network 106, where the output content item no longer contains the at least one regional dialect.

The converting system 108, represented as a server distinct from the first and second user devices 104, 112 in FIG. 1 but that may be integrated in one of them, receives the input content item 102. The input content item 102 is a message, such as a text message or a voice message, that contains syntagmas (at the lowest level: words, or at a higher level: idioms and expressions), called herein "entities". In the example of FIG. 1, the input content item is "She bunked the class yesterday, she was chumming" (italics are used to improve the readability of the description). The converting system 108 identifies at least one entity in the input content item 102. In the example of FIG. 1, the identified entities are "bunked", "class" and "chumming". The converting system 108 may also, if needed, convert the entity into a root entity, so that, for example, the root entity of an entity that is a verb in past tense ("bunked") is the infinitive form of the verb ("bunk") or the root entity of a plural form is the singular form. In the rest of the description, for conciseness reasons, it will be assumed that the entity and the root entity are the same. The converting system 108 then retrieves for each entity, from a database, one or more meanings. If an entity has only one meaning, then only one meaning is retrieved. By using a plurality of meanings for an entity, the converting system 108 may determine whether the entity is used as a regional dialect (e.g., slang) or as a regular meaning of the word. To that end, in the database, each couple entity-meaning is associated with a local context or a global context of the entity. A local context may include, for instance, a specific region of the world, such as a continent, a country, a county, a town, or any subdivision of a territory. A local context may also include a nationality or a culture of a specific people with their own dialect. Conversely, a global context includes the whole world. A couple entity-meaning associated with a global context for the entity means that the entity is understood by anyone speaking the language (for instance, a "car" is understood as being a vehicle for any English-speaking person in the world). In the example of FIG. 1, for entity "bunk", the following meanings are retrieved: "sleep in a bunk" (context: local, US) and "skip" (context: local, India). Those two couples entity-meaning are associated with a local context for the entity (US and India, respectively). Using the retrieved meanings, the converting system 108 computes a weightage for each possible interpretation of the input content item 102. An interpretation of the input content item is the input content item in which each entity is replaced with one meaning. For instance, if an input content item has two identified entities with two meanings each, the number of interpretations is 2×2=4. The weightage may take into account a grammatical aspect of the interpretation and/or a semantic aspect of the interpretation. In addition, the weightage may take into account the context of the meaning itself (especially in relation to a context of the input content item), to favor couples entity-meaning with a local context of the entity that is related to the context of the input content item (e.g., a message sent from India is likely to use slang from India). Once each interpretation has a weightage, the converting system 108 selects an interpretation. Typically, the interpretation with the highest weightage is selected. By selecting an interpretation, the converting system 108 actually selects, for each entity, one of the plurality of meanings. As every couple entity-meaning is associated with a context for the entity, the converting system 108 knows whether, in the selected interpretation, the entities of the input content item 102 were used as a generic meaning (global context for the entity) or as a dialect or slang (local context for the entity). Finally, the converting system 108 generates for output, to the second user device 112 the output content item 110. The output content item 110 corresponds to the input content item 102 in which some entities are replaced each with its respective meaning that is used in the selected interpretation. Minor adaptations of the meanings may be carried out, to match the form of the original entity, as explained above for the identification of the entities and root entities. In an implementation, to convert only the dialect and not the words that are understood by anyone speaking the language, the converting system 108 substitutes the entity with the meaning when it is determined that the couple entity-meaning is associated with a local context of the entity. In other words, only entities used as slang in the input content items are replaced with their respective meaning in the interpretation. Alternatively, instead of replacing an entity with its associated meaning in the interpretation, the converting system 108 may use a synonym of the couple entity-meaning, wherein the synonym may have a local context. The meaning in the couple entity-meaning may already be a synonym of the entity (either with a global context or with a local context). However, replacing the meaning with a synonym (with a local context, for instance) may be chosen after the interpretation has been selected, in order to keep a database only with meanings with a global context or at least high-level local context (e.g., a country and not a town). These two techniques allow the present system to efficiently convert a piece of slang into another piece of slang. They will be described in more detail below.

Figure 2:
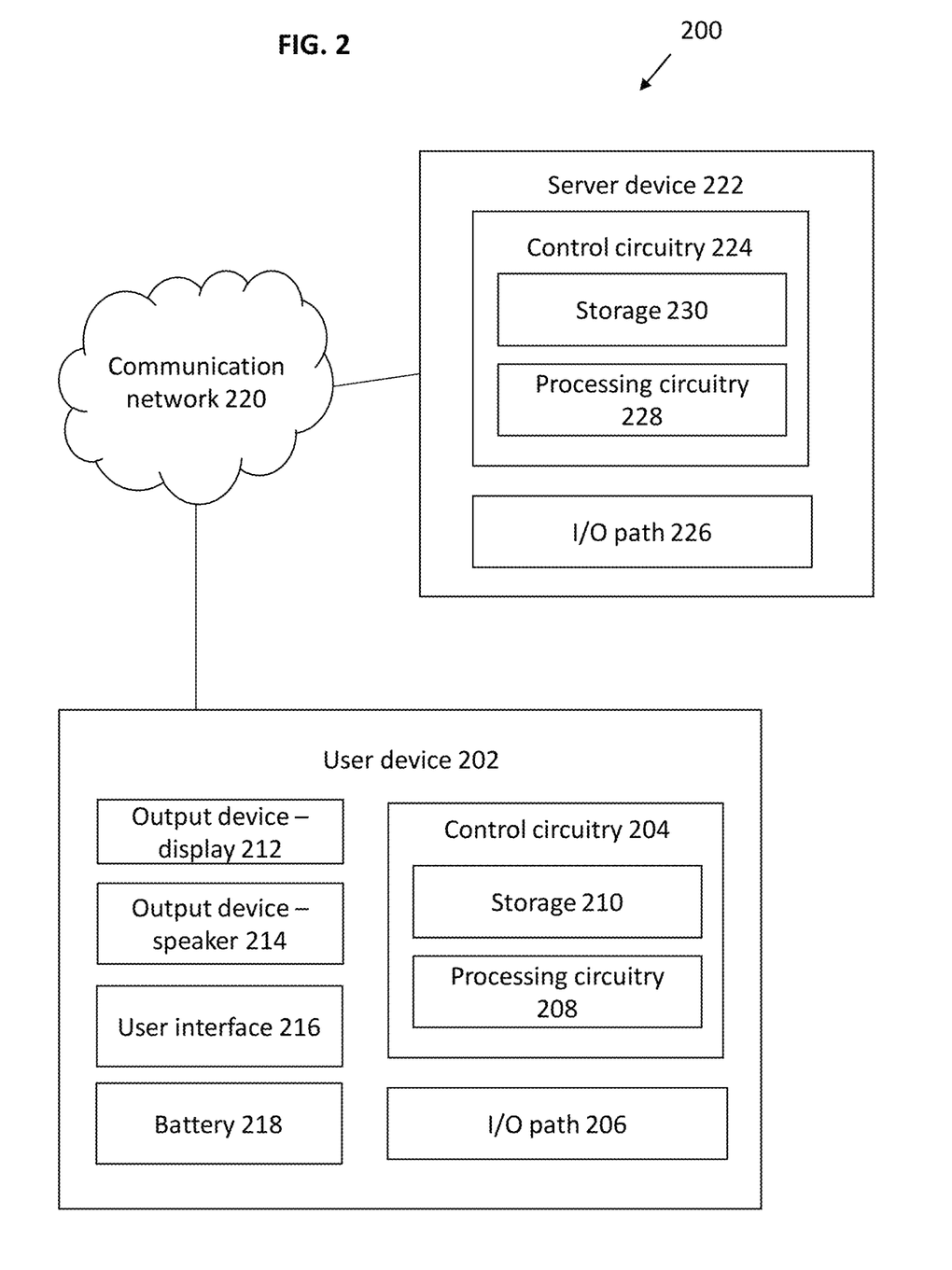
FIG. 2 is an illustrative topology of equipment (or computing configuration) programmed and configured for converting linguistic regionalism, in accordance with some embodiments of the disclosure.

FIG. 2 shows an illustrative block diagram of a computing configuration 200 that may include the converting system presently described. Computing configuration 200 includes two user devices 202 (only one user device is illustrated). The user devices 104, 112 of FIG. 1 may be the user device 202 of FIG. 2. In some embodiments, the user device 202 may include control circuitry 204 and an input/output (I/O) path 206. Control circuitry 204 may include processing circuitry 208, and storage 210 (e.g., RAM, ROM, hard disk, removable disk, etc.). I/O path 206 may provide device information, or other data, over a local area network (LAN) or wide area network (WAN), and/or other content and data to control circuitry 204. Control circuitry 204 may be used to send and receive commands, requests, signals (digital and analog), and other suitable data using I/O path 206. I/O path 206 may connect control circuitry 204 (and specifically processing circuitry 208) to one or more communication paths.

User device 202 may include at least one output device, such as a display 212 (e.g., a screen) and/or a speaker 214, to output content visually and audibly. In addition, to interact with a user, user device 202 may include a user interface 216. The user interface 216 may include, for example, a touchscreen, mouse and/or keyboard. The user interface 216 is connected to the I/O path 206 and the control circuitry 204. In an embodiment, the user interface 216 may be a touchscreen enabling the user to provide input(s) to the user device. The display 212 may be a screen (such as a monitor or a TV). The user device 202 may be a smartphone, a tablet, an e-reader, a laptop, a smart TV, a phablet, etc. Alternatively, the output device and the user interface may be connected to the user device. In this case, the user device may be a set-top box, a computer tower, etc.

In an embodiment, the user device 202 comprises a battery 218, which is configured to provide energy (or power) to all the components of the user device 202 that require energy, such as the control circuitry 204 and the output devices 212, 214.

Control circuitry 204 may be based on any suitable processing circuitry such as processing circuitry 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel® Core i7 processors) or multiple different processors (e.g., an Intel Core® i5 processor and an Intel® Core i7 processor).

Memory may be an electronic storage device provided as storage 210, which is part of control circuitry 204. Storage 210 may store instructions that, when executed by processing circuitry 208, perform the processes described herein. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions). Storage 310 may be configured to store the media asset or at least to act as a buffer when the media asset is being streamed.

Computing configuration 200 may also include a communication network 220 and a server device 222. The remote server of the converting system 108 as disclosed in relation to FIG. 1 may be the service device 222. The user device 202 may be coupled to the communication network 220 to communicate with the server device 222. The communication network 220 may be one or more networks including the Internet, a mobile phone network, mobile voice or data network (e.g., a 5G, 4G or LTE network), mesh network, peer-to-peer network, cable network, or other types of communication network or combinations of communication networks. The communication network 106 of FIG. 1 may the communication network 20.

In some embodiments, server device 222 may include control circuitry 224 and an input/output (I/O) path 226. Control circuitry 224 may include processing circuitry 228, and storage 230, which may similar to those already discussed in relation to the user device 202.

Figure 3:
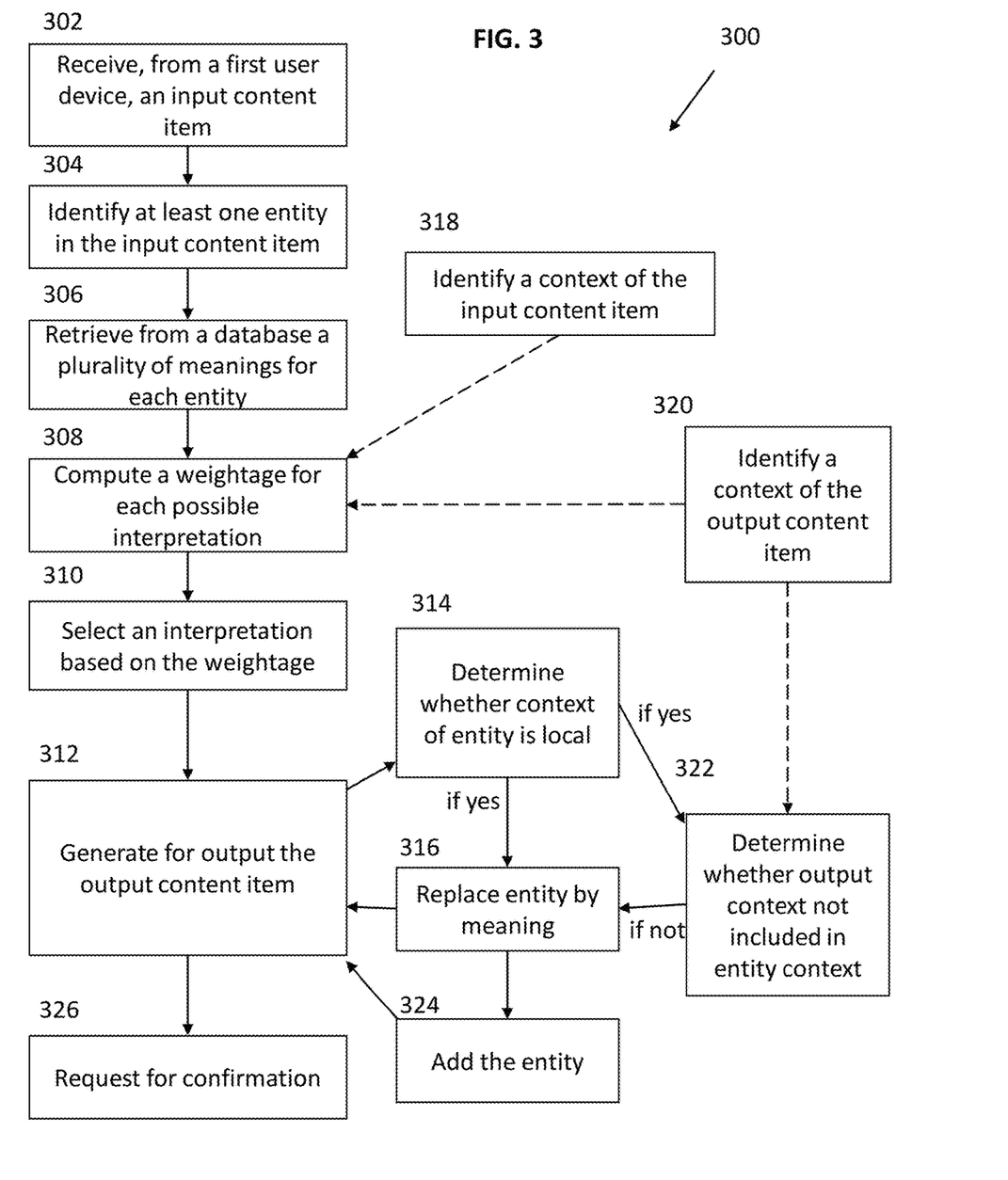
FIG. 3 is an illustrative flowchart of a process for converting an input content item (e.g., speech or text) into an output content item (e.g., speech or text), in accordance with some embodiments of the disclosure.

The converting system may comprise any of the user devices 202 or the server device 222, in a client/server approach. Alternatively, the converting system may be distributed over the user device 202 and the server device 222.
Description of the Method FIG. 3 is an illustrative flowchart of a process 300 for converting an input content item into an output content item, in accordance with some embodiments of the disclosure. Unless specified otherwise, process 300, and any of the following processes, may be executed by any of control circuitry 204 or 224 or any combination thereof, using the communication network 220. FIG. 3 will be detailed in relation to FIGS. 4A and 4B, which illustrate some steps of FIG. 3. In particular, in the following paragraphs, it is assumed that the converting system is carried out by the control circuitry 224 of the server device 222.

At step 302, control circuitry 224 receives an input content item 402, for instance a text message or a voice message. The input content item 402 is received from a first user device via a communication network. The first user device may be associated with a first user account. The input content item 402 corresponds to what was sent by a user of the first user device. In other words, he or she has approved the input content item. As will be described below, a context may be associated with the input content item 402. This context is local, in the sense that it specifies a region that may assist the converting system to select the best interpretation. The input content item 402 may be a message for one or more specific recipients (e.g., direct messages) such that control circuitry may receive, with the input content item 402, a list of recipients. Alternatively or additionally, the input content item 402 may be a message for an unspecified number of recipients (e.g., tweets).

Figure 4A:
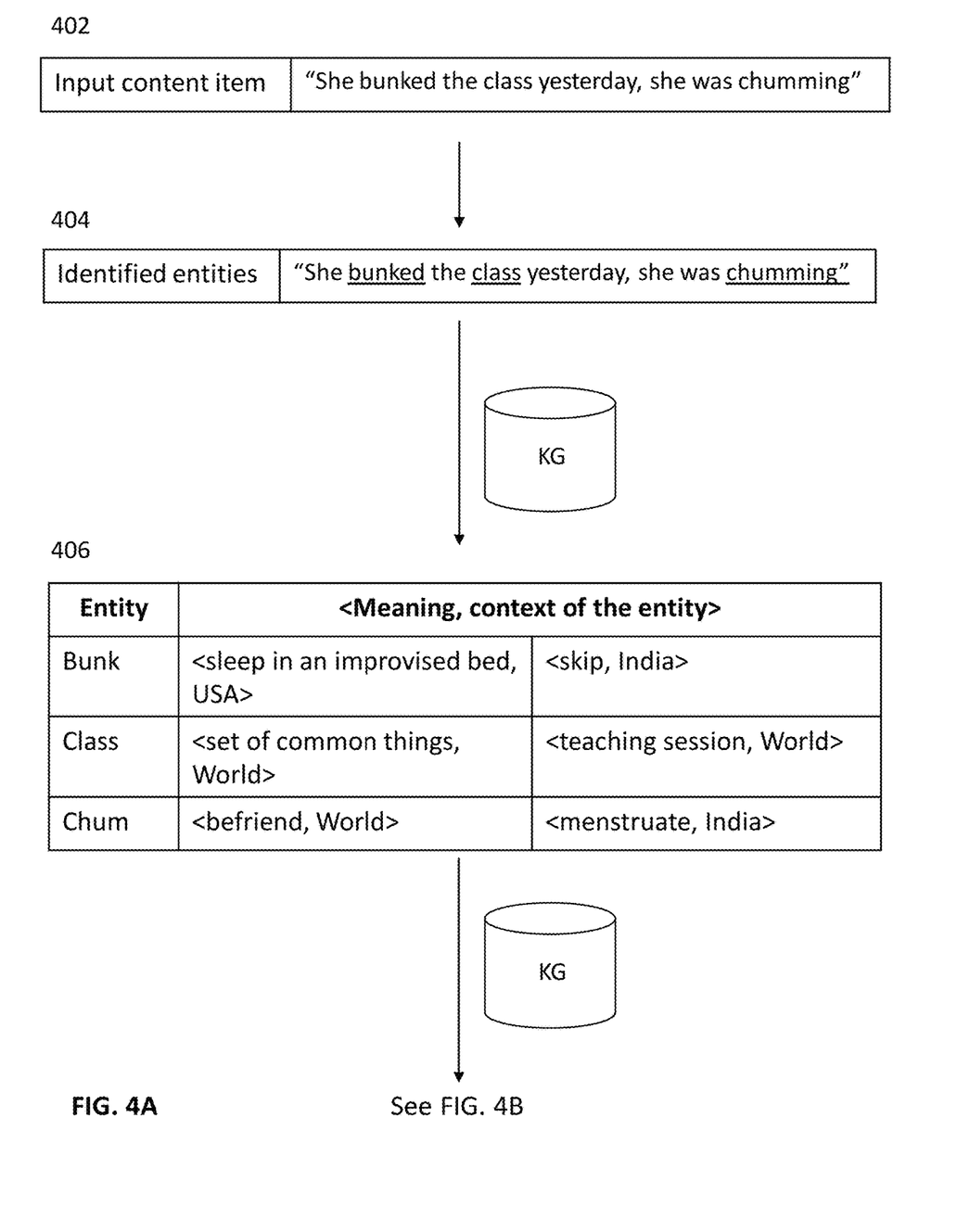
FIGS. 4A and 4B, is an illustrative representation of a process for converting an input content item (e.g., speech or text) into an output content item (e.g., speech or text), in accordance with some embodiments of the disclosure.

At step 304, control circuitry 224 identifies in the input content item 402 at least one entity 404 (underlined in FIG. 4A). In an implementation, an entity is a word or a group of words (e.g., idioms) of the input content item. There are therefore as many entities as there are words or groups of words. In an implementation illustrated on FIGS. 4A and 4B, an entity is a word or a group of words that is significant in a sentence for the reader to understand the meaning of the sentence. For example, in "She bunked the class yesterday, she was chumming", control circuitry 224 does not consider words "she","the","yesterday", as relevant and they are not therefore identified as entities. Conversely, words "bunked", "class", "chumming" are considered by control circuitry 224 as relevant and are marked as entities. For instance, control circuitry 224 may discard words that are not verbs, nouns or adjectives: pronouns, articles and adverbs are therefore discarded and not identified as entities. For instance, control circuitry 224 may look up in a table (e.g., a database) the definitions for each word or group of words and, based on the definitions, may determine that the word is an entity (more than one definition, or definitions that carry meaning, etc.).

At step 306, control circuitry 224 retrieves, for each identified entity, one or more meanings of the entity. The meanings are retrieved from a database, which may be stored in storage 230 of server device 222. Table 406 illustrates a portion of that database. Each couple entity-meaning is in addition associated with a context of the entity, the context being either global (e.g., worldwide) or local (e.g., London, England, UK, US, India, etc.). In a couple entity-meaning, a global context of the entity means that the entity has the meaning in any place around the world where people speak the language of the input content item. In FIG. 4A, table 406 illustrates the database by showing the couples entity-meaning that are retrieved at step 306 for the identified entities 404. For example, couple entity-meaning "class-set of common things" has a global context for "class" (indicated as "worldwide"). This means that "class" is understood as "set of common things" everywhere in the English-speaking world. An entity may have several meanings, and the couples entity-meaning may have different contexts. For example, couple entity-meaning "chum-befriend" has a global context for the entity (which means that throughout the English speaking world "chum" means "befriend") and couple entity-meaning "chum-menstruate" has a local context for the entity defined as India (which means that, in India, "chum" may mean "menstruate"). It is therefore observed that "chum" may either be a regular word or slang. This ambiguity of the terms is the reason why merely looking up each word in a table or a dictionary to identify slang is often not sufficient. Therefore, process 300 uses interpretations of the input content item as a whole to identify slang, as will be explained below.

Retrieving meanings, at step 306, may be achieved by accessing a knowledge graph KG. In the knowledge graph, each entity is associated with one or more meanings, and each meaning may itself be associated with other meanings or synonyms, such that a web of nodes and edges which represent information about relationships between different items is created. The database may be included or be part of a knowledge graph. More details about the knowledge graph are discussed below.

At step 308, control circuitry 224 computes a weightage for each possible interpretation of the input content item 402. An interpretation of the input content item 402 is the input content item in which each identified entity is replaced with one of the one or more meanings. In other words, a template is created from the input content item, based on the identified meaning, that reads: "she <entity> the <entity>, she was <entity>", wherein each <entity> may be populated by its one or more meanings. Table 408 represents all the possible interpretations of input content item 402 based on the meanings of table 406. As there were three entities ("bunk", "class", and "chum"), with two meanings each, table 408 includes $2^3=8$ interpretations. Table 408 also includes an example of weightages attributed to interpretations. If each entity has only one meaning, then only one interpretation is generated and a weightage may then not be computed. The weightage may take into account a grammatical meaning of the interpretation, a semantical meaning of the interpretation, an overall meaning of the input content item and other considerations related to the contexts. For instance, in FIG. 4B, interpretations #1 to #4 are grammatically incorrect and therefore their weightage is low; interpretations #5 and #6 are semantically unusual and therefore their weightage is medium; interpretations #7 and #8 are semantically meaningful and therefore their weightage is high. However, interpretation #8 makes more sense than interpretation #7, in particular because of the overall meaning of the input content item (for instance, "she" in the sentence, in relation to "menstruating") or the context of the input content item, which is India, as well as the local context of the entity "chum" in the couple "chum-menstruating". It is therefore observed that the weightage is computed for the interpretation as a whole and not only as a sum of weightages for each couple entity-meaning. Some couples entity-meaning may specifically increase the weightage, but there is an interrelation between the couples entity-meaning. More details will be given below.

Computing weightages, at step 308, may also be achieved by accessing the knowledge graph. The strength of a link between an entity and a meaning may be taken into account in the weightage. The strength of a link may be determined by monitoring an occurrence of the entities by a user account or a user device.

Figure 4B:
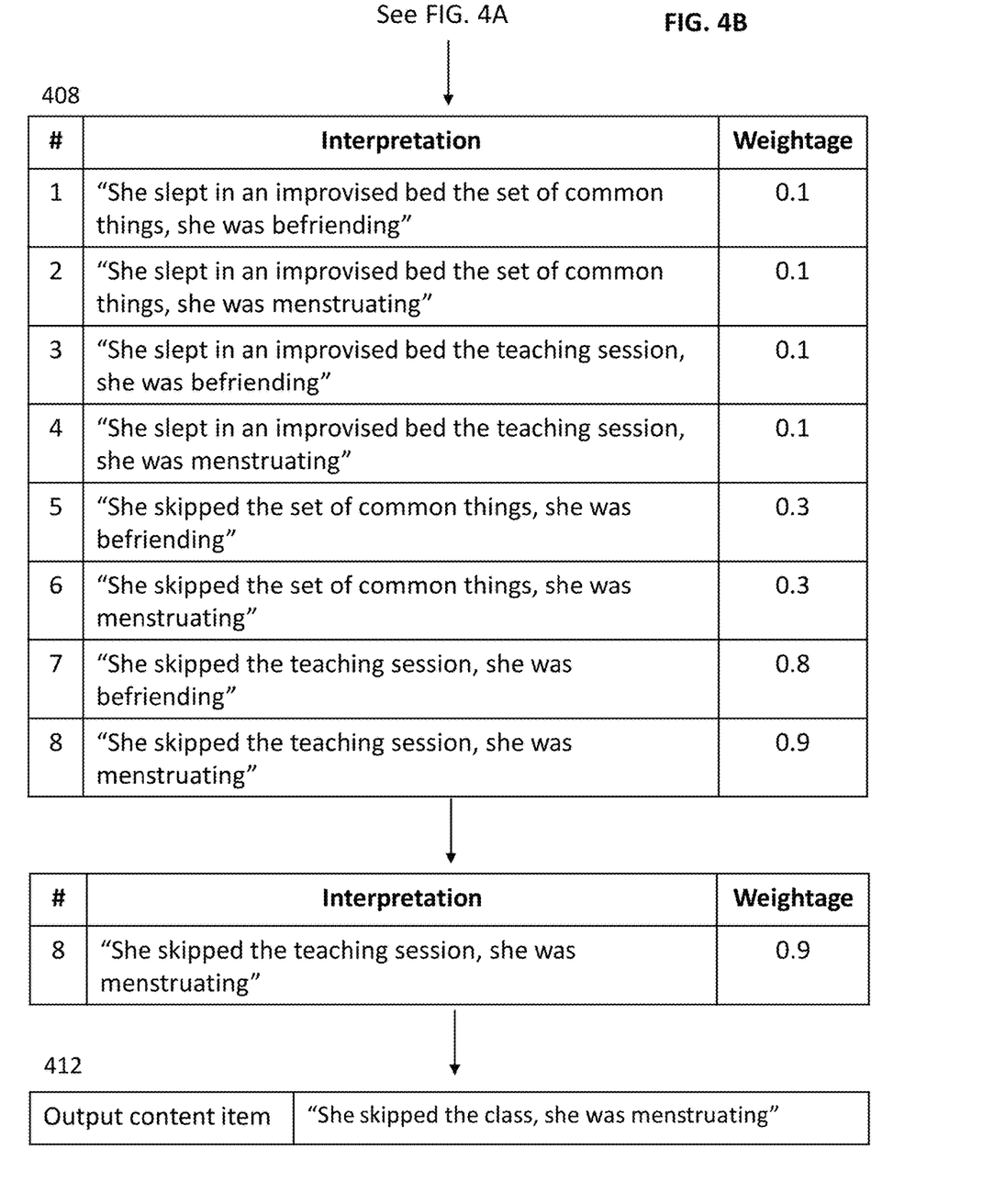

At step 310, control circuitry 224 selects an interpretation based on the weightage. Typically, the interpretation with the top scoring weightage is selected. In the example of FIG. 4B, that top scoring interpretation is interpretation #8: "She skipped the teaching session, she was menstruating". This means that interpretation #8 is considered to be a faithful interpretation of the input content item 402. As observed in table 408, in an interpretation, no entity is left unreplaced. Therefore, even words that do not need to be replaced because their meaning is not more accessible than the entity itself are replaced. Consequently, control circuitry 224 may need to carry out another step before sending out the modified input content item.

At step 312, control circuitry 224 generates for output an output content item 412. The output content item 412 is generated for output to the second user device. The second user device may be associated with a second user account. The output content item 412 is made of the input content item in which at least one entity is replaced by the meaning it has according to the selected interpretation at step 310, or replaced by a synonym thereof (a synonym of the entity under the specific meaning or a synonym of the meaning). Minor adaptations may be carried out, such as those discussed above with respect to the entity and the root entity (plural form, tenses, etc.). However, to avoid an entity that can be understood everywhere in the language-speaking world being replaced by its meaning or a synonym in the output content item, control circuit 224 may apply a criterion for the substitution. Control circuitry 224, at step 314, determines whether, for each entity 404 of the input content item 402, the couple entity-meaning in the selected interpretation is associated with a context of the entity that is local. In that case, control circuitry 224 replaces, at step 316, the entity with the meaning. When control circuitry 224 determines that the couple entity-meaning in the selected interpretation is associated with a context that is global, then control circuitry does not replace the entity with the meaning (not illustrated in FIG. 3). In the illustration of FIG. 4B, interpretation #8 was selected at step 310. Interpretation #8 includes the following couples entity-meaning: "bunk-skip", with a context for "bunk" that is local (India), "class-teaching session", with a context for "class" that is global (world), "chum-menstruate", with a context for "chum" that is local (India). Control circuitry 224 then replaced only "bunk" by "skip" and "chum" by "menstruate", because their context is local (i.e., words that are used locally, in India). However, "class" is not replaced by "teaching session" because the context of the entity in the couple "class-teaching session" is global, which means that "class" will be understood by any user of the second user device. As indicated above and as illustrated in FIG. 1, instead of replacing the entity with its meaning, control circuitry may retrieve a synonym of the meaning. For instance, instead of "menstruate", control circuitry may use "have her period", even though "have her period" was not considered at step 306 and 308 (i.e., it was not one of the meanings in the database). The use of a synonym may enable the converting system to efficiently convert a piece of slang into another piece of another slang without having to incorporate in the database all the local meanings of entities or to convert a very formal meaning ("menstruate") into a more colloquial term ("to have one's period"), if not already in the database. It allows the database to be smaller in size and applicable for every region of the world. In this regard, the implementation with the synonym is particularly relevant when used in relation to a context of the output content item. More details will be provided below.

Knowledge Graph

As indicated above, the database may include a knowledge graph. Knowledge graphs and their features are described in greater detail in U.S. patent application Ser. No. 14/501,504, filed Sep. 30, 2014, U.S. patent application Ser. No. 14/500,309, filed Sep. 29,30 2014, and U.S. patent application Ser. No. 14/448,308, filed Jul. 31, 2014, which are hereby incorporated by reference herein in their entireties. A knowledge graph provides information about a multitude of entities and their relationships with other entities and associated attributes and may be derived from a corpus from a wide variety of sources. A knowledge graph is composed of nodes and edges which represent information about relationships between different entities and associated attributes. Although the depicted knowledge graph comprises nodes and edges, it is only an illustrative embodiment. A knowledge graph can comprise of other suitable modes of representation of relationships between different entities without departing from the scope of this invention. For example, a knowledge graph may include databases, lists, and collections that represent objects and their associated relationships.

Knowledge graph may be stored using storage circuitry. Data structures such as linked lists, trees, graphs, buckets or arrays may be used to represent the knowledge graph in storage circuitry and may be tagged with an identification to indicate a relationship of an entity and associated attributes. The knowledge graph may be stored locally on a user equipment device or stored remotely and accessed through a communications network. The knowledge graph may be stored entirely in one location or be split into sections, and each section stored at one of a plurality of locations. In some embodiments, knowledge graph may be generated dynamically upon request using content from a content source.

Grammatical Meaning and Semantic Meaning of the Interpretation

In an embodiment, the weight takes into account a grammatical meaning of the interpretation. For example, as illustrated in FIG. 4B, some interpretations are grammatically correct and some other interpretations are not grammatically correct. This may occur in particular when an entity is a verb that has a transitive meaning and an intransitive meaning: interpretations #1 to #4 convert "bunk", which is employed as a transitive verb ("to bunk something") followed by an object in the input content item ("She bunked the class, [. . . ]"), into a meaning with an intransitive verb with an object (in interpretations #1 and #2: "she slept in an improvised bed the set of common things", and in interpretations #3 and #4: "she slept in an improved bed the teaching session"). As an intransitive verb cannot grammatically accept an object, the interpretation is considered incorrect and the weightage is determined accordingly (e.g., a low weightage).

To make sure that an interpretation with incorrect grammar cannot get selected, control circuitry 222 may attribute thereto a weightage that is below a threshold, and control circuitry 222 may further discard all interpretations that are below the threshold.

Description of the Context of the Input Content Item

Figure 5:
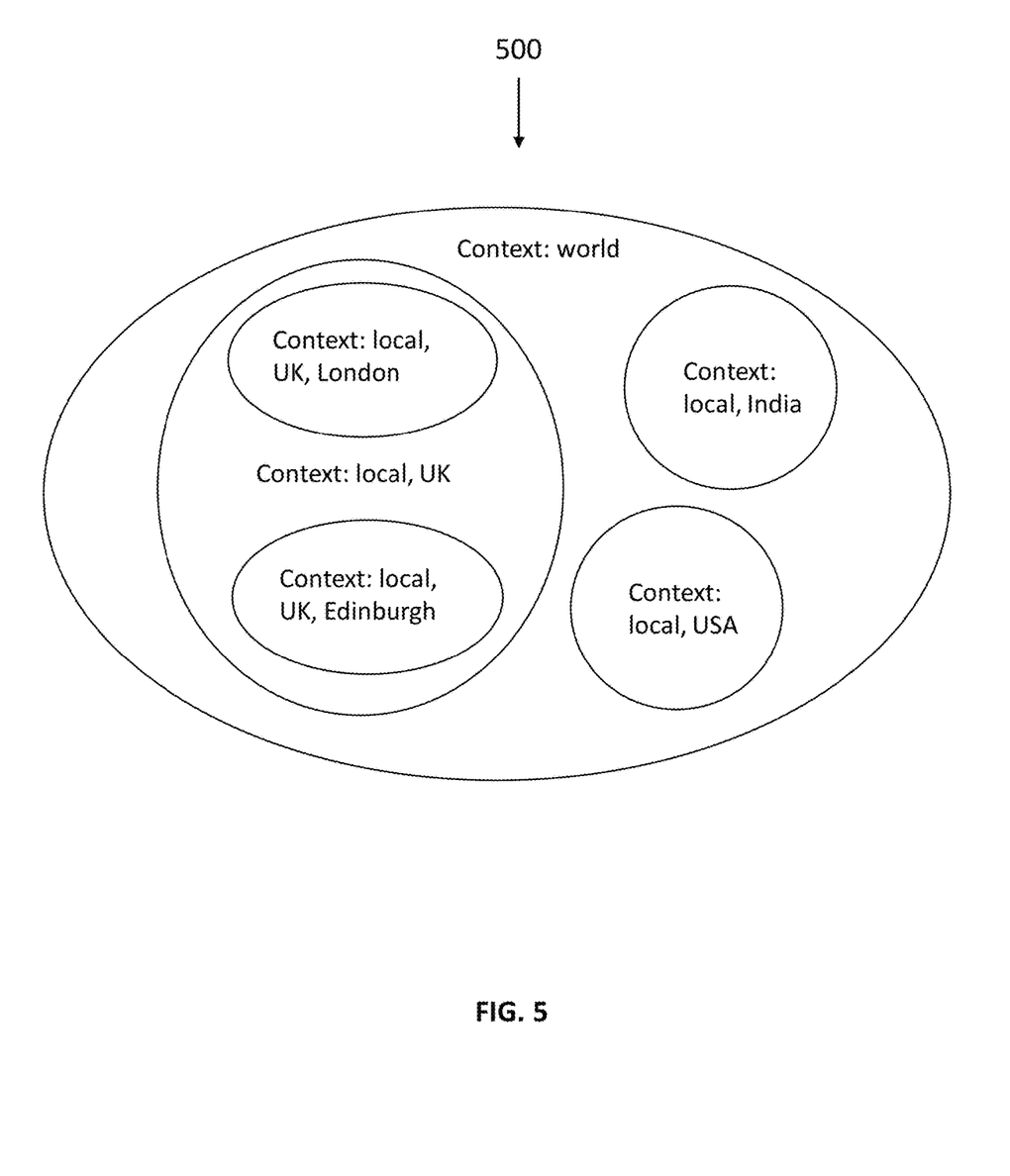
FIG. 5 is an illustrative representation of the relationship between a global context and local contexts, in accordance with some embodiments of the disclosure.

In an embodiment, also illustrated in FIG. 3, at step 318, control circuitry 224 identifies a context of the input content item 402. The context is then compared with the local or global context of each couple entity-meaning and is taken into account in the weightage of the interpretation. The context of the input content item may be identified based on the first user profile, a first user device location, preferences of the first user profile, language options (for instance, English UK or English US), or automatic recognition of the language. A history of messages sent by the first user profile or the first user device and a history of selected interpretations may also be used: for instance, when selected interpretations often include couples entity-meaning associated with a same local context (e.g., India), control circuitry 224 may identify India as local context by default. The relationship between contexts may be that of inclusion, as illustrated in the diagram 500 in FIG. 5, where different local contexts are shown as included in a global context ("world") and where local contexts are included or excluded from other local contexts. For instance, a local context of London is included in a local context of UK, which is included in the global context. It is assumed that any meaning associated with a context is applicable to the context that is included therein. For instance, a couple entity-meaning with a local context for the entity that is the UK also has a local context that is Edinburgh or London (a word with a meaning in the UK is understood in Edinburgh and London). In an implementation, the closer the local context of the entity in the couple entity-meaning to the context of the input content item, the higher the contribution to the weightage of the interpretation. This implementation may be carried out to distinguish interpretation with similar weightages after a grammatical or semantical screening has been performed. For instance, between two interpretations that are grammatically correct and semantically meaningful, an interpretation that involves an entity whose couple entity-meaning is associated with a local context for the entity that is identical to or slightly broader than that of the input content item will have a higher weightage. For instance, with a local context of London for the input content item, a local context of London (then England, then UK) for the meaning in the couple entity-meaning is more likely to give a higher weightage to the interpretation. If all other aspects are equal (grammatical and semantic correctness, among others), for an input content item associated with a local context that is London, an interpretation with a couple entity-meaning associated with a local context of the entity that is London will have a higher weightage than an interpretation with a couple entity-meaning associated with a local context of the entity that is England, which, in turn may have a higher weightage than an interpretation with a couple entity-meaning associated with a local context of the entity that is the UK, or of course a global context.

Description of the Context of the Output Content Item

In an embodiment, also illustrated in FIG. 3, at step 320 control circuitry 224 identifies a context of the output content item that is to be generated. Several implementations may use the context of the output content item: in an implementation, the context of the output content item is compared with the local or global context of the meaning in the couple entity-meaning and is taken into account during the substitution of the entity for its meaning; in another implementation, the context of the output content item is compared with a context of the meaning (not the context of the entity) in the couple entity-meaning to decide about the substitution; in another implementation, the context of the output content item is involved in choosing the most appropriate synonym of the entity. Those implementations will be described in detail below.

The context of the output content item may be identified based on a second user profile, on the second user device, such as the second user device location; on preferences of the second user profile; language options (for instance, English UK or English US) or automatic recognition of the language. A history of messages sent by the second user profile or second user device and a history of selected interpretations may also be used. For instance, when selected interpretations often include couples entity-meaning associated with a same local context for the entity (e.g., India), control circuitry 224 may identify India as the local context. Again, the relationship between contexts may be that of inclusion. For instance, a local context that is London is included in a local context that is the UK, which is included in the global context. It is assumed that any meaning associated with a context is applicable to the context that is included therein. For instance, a local context of the output content item that is London also has a local context that is the UK (if the user is from London, any London or British slang will be understood).

When a message is sent to one or more specific recipients, control circuitry may also receive identifier(s) of the recipient(s) (e.g., identifier of a user account, such as a phone number, an email address, etc.) along with receiving the input content item. Using the identifiers, control circuitry 224 may retrieve the context of the second user profile or second user device. When a message is sent to anyone who may read it (e.g., Twitter®), process 300 may be performed by the second user device directly, such that the context of the output content item is immediately accessible or may be performed by the server upon request of the second user device. For a same input content, each second user device may then receive a personalized output content item, depending on the local context of the output content item for that user device.

First Use of the Context of the Output Content Item (as a Function of the Entity)

In an implementation, the context of the output content item is used when control circuitry 224 replaces the entity with its meaning in the selected interpretation, at steps 312 and 316. In particular, the entity is replaced by its meaning only if the context of the output content item is not included in the local context of the entity associated with the couple entity-meaning. Said otherwise, the entity is not replaced with its meaning when the context of the output content item is included in the local context of the entity in the couple entity-meaning. As mentioned above, the entity is not replaced when the couple entity-meaning is associated with a global context of the entity, as it means that the word can be understood anywhere in the world for someone speaking the language. At step 322, control circuitry determines whether the context of the output content item is not included in the local context of entity of the couple entity-meaning, and, in that case (i.e., when it is not included), at step 316, when the determination of step 314 is also verified, control circuitry 224 replaces the entity with its meaning. Step 322 may be carried out only if the determination of step 314 is verified (because if not verified, then there is no replacement of the entity with its meaning).

Second Use of the Context of the Output Content Item (as a Function of the Meaning)

Figure 6:
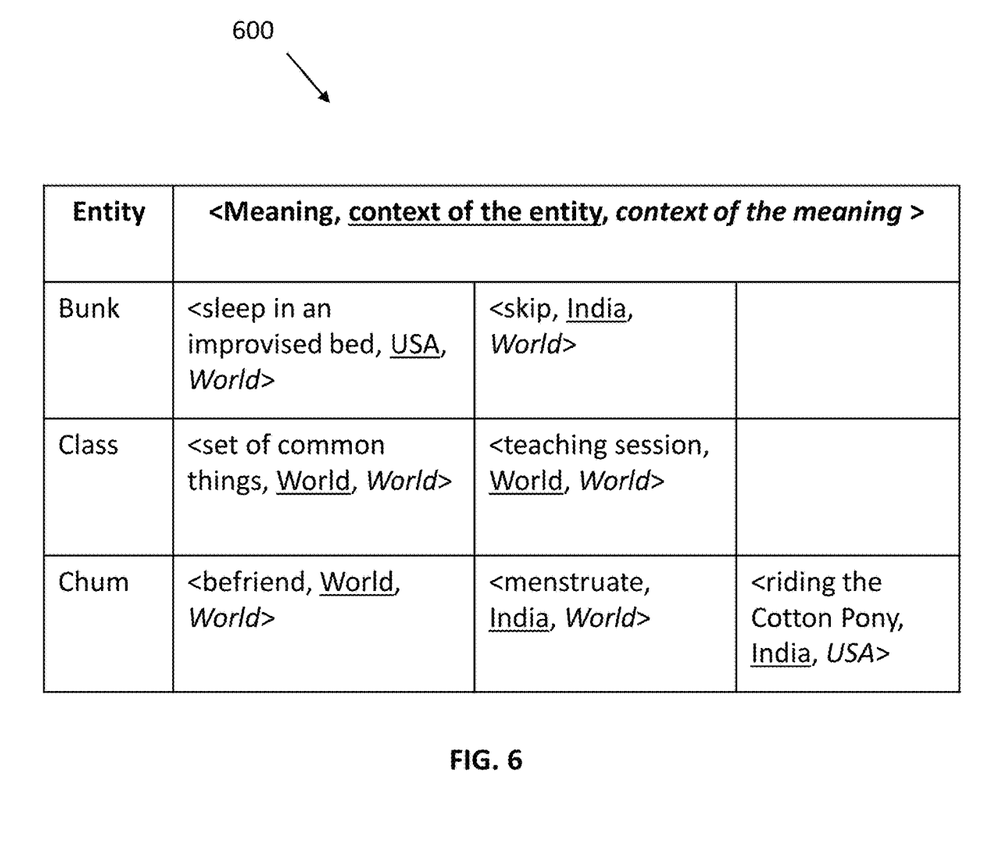
FIG. 6 is an illustrative representation of a database as used, for example, in a knowledge graph, which takes into account a local context of the entity and a local context of the meaning, in accordance with some embodiments of the disclosure.

In an implementation illustrated in FIG. 6, which represents a portion of a database 600 similar to that of 406 in FIG. 4, the database may also include, for each couple entity-meaning, a context of the meaning. Such context is then used with the context of the output content item in the weightage of the interpretation (see arrow in FIG. 3). For instance, "chum" means "befriend" in a general meaning (global context, represented as "world" in FIG. 6); therefore the couple entity-meaning is associated with a global context for the entity. However, the meaning itself may have its own context. "Befriend" is a word understood by anyone speaking the language therefore its context is global as well ("world" in FIG. 6). "Chum" also means "menstruate" in a specific meaning (local context, represented as "India" in FIG. 6); therefore the couple entity-meaning is associated with a local context for the entity. As "menstruate" is a word understood by everybody, the context of the meaning in the couple entity-meaning is therefore global. Conversely, it is possible that the database 600 also includes meanings that are themselves slang, that is to say, words with a local context. "Chum" also means "ride the cotton pony" in a specific meaning of "chumming" (local context of entity, represented as "India" in FIG. 6). It has been explained before that the couple entity-meaning is associated with a local context for the entity; however, as "ride the cotton pony" is only understood in the US, the couple entity-meaning is associated with a local context (US, in FIG. 6) for the meaning. The couple entity-meaning is therefore associated with a context for the entity (marked as underlined in FIG. 6) and a context for the meaning (marked in italics in FIG. 6): couple entity-meaning "chum-menstruate" is associated with India (local context) for "chum" (the entity) and with world (global context) for "menstruate" (the meaning) because, in India, "chum" means "menstruate" while "menstruate" is understood throughout the world; couple entity-meaning "chum-ride the cotton pony" is associated with India (local context) for "chum" (the entity) and with US (local context) for "ride the cotton pony" (the meaning) because in India "chum" means "ride the cotton pony", while "ride the cotton pony" is understood in the US only. In other words, the database may be used to explain the slang of one country with the slang of another country.

Control circuitry 224 may compute the weightage taking into account the context of the meaning associated with a couple entity-meaning and using the output content item. For instance, an interpretation in which, for a couple entity-meaning, a meaning has a local context in Edinburgh, may have a higher weightage when the output content item has a local context of Edinburgh as well. Conversely, if the local context of the output content item is not included in the local context of the meaning, the weightage may be decreased or set to 0 to make sure the interpretation cannot be selected at step 310. This ensures that a piece of Indian slang will not be converted into a piece of London slang if the second user device or profile has a local context of Edinburgh.

Third Use of the Context of the Output Content Item

In an implementation, the context of the output content item is used to determine a synonym when replacing the entity based on the selected interpretation. Instead of replacing the entity with the general meaning (for instance a meaning with a global context), control circuitry may replace the entity with a synonym based on the meaning. The synonym may have a context in which the local context of the output item content is included. For instance, for a local context of the output content item that is the US, if the meaning chosen for "chum" is "menstruate", instead of replacing "chumming" with "menstruating", control circuitry may look up "riding the cotton pony" in a database (e.g., a synonym database) to replace "chumming". This way, a piece of slang of the US replaces a piece of slang of India when the second user device or profile has a local context of US.

Whether the entity is replaced with a synonym after an interpretation is selected, based on the couple entity-meaning (see above), or the entity is replaced with the meaning after an interpretation is selected, based on the couple entity-meaning (see above as well), are two different options. In the former, the database may have only couples entity-meaning where the meaning itself has a global context (e.g., the database does not explain a slang with more slang), such that the database can be used worldwide and is more manageable to handle. In the latter, the database may have couples entity-meaning where the meaning itself has a local context (e.g., the database does explain some slang with other slang), such that for a given entity the number of couple entity-meaning will be larger, but the whole process may be handled via the interpretations (no need to look up a synonym). The process may involve a mix of both implementations, in case the database is not complete for every piece of slang in the world, but there are more exhaustive databases for synonyms (provided by a third party for instance, which may specialize in slang).

Dual Display of Entity and Meaning/Synonym

As represented in FIG. 3, when generating for output the output content item, at step 312, control circuitry 322 may also generate for display, at step 324, the entity of the input content item that was replaced by its meaning or a synonym, so that the second user device receives both pieces of information. This allows the user of the second user device to access the original message in order to learn new words and/or to check if the selected interpretation is appropriate (grammatically and semantically). The entity may be added in brackets after the meaning (which replaces the entity of the input content item in the output content item), may appear as a footnote, or may appear when the user clicks on the meaning, etc. Alternatively, an indication that the meaning is not the original entity may be displayed on the second user device, with an option to display the original entity.

Confirmation

As represented in FIG. 3, control circuitry 224 may also generate, at step 326, a request for input, to the second user device, about the accuracy of the output content item compared to the input content item. Step 326 may be performed once step 312 (generate for output the output content item) has been performed and once the output content item has been displayed on the second device, or simultaneously with such display. Based on the input provided by the second user device in response to the request, control circuitry 224 may generate instruction to update or may update the database or the weightage algorithm. In particular, the relationships between entities and meanings may be strengthened in the knowledge graph. Alternatively or additionally, this request about the accuracy may be sent to the first user device (not illustrated in FIG. 3). As the user of the first user device is the person who created the input content item, he or she may be the best person to indicate whether the selected interpretation is accurate or not. In that case, the request may be sent to the first user device before step 312 (generating for output the output content item) and step 312 is performed in response to the first user device sending positive feedback. This, however, may slow down the fluidity of the exchange and requires a user input at an early stage of process 300, but it may increase the quality of the exchange. In particular the user does not need to change the slang for the meaning as it had been carried out automatically by the converting system.

General Considerations

The methods and/or any instructions for operating any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory (RAM), etc.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A computer-implemented method for converting an input content item into an output content item, the method comprising:
   receiving, from a first user device, the input content item;
   identifying at least one entity in the input content item;
   retrieving from a database, for each entity, one or more meanings of the entity, wherein each couple entity-meaning is associated with a local context or a global context of the entity;
   computing a weightage for each possible interpretation of the input content item, wherein the weightage takes into account a grammatical aspect of the interpretation, and wherein an interpretation of the input content item is the input content item in which each entity is replaced with one of the one or more meanings;
   identifying, based on the grammatical aspect, a threshold weightage;
   identifying, based on comparing the computed weightage to the threshold weightage, that the computed weightage is above the threshold weightage;
   selecting the interpretation of the input content item based on the weightage;
   identifying, for each entity, whether the context is global or local;
   if the identified context is local:
      identifying a language associated with a second user device;
      determining whether the identified language corresponds to the identified local context; and
      if the identified language corresponds to the identified context:
         not replacing the entity in the output content item corresponding to the input content item; or
      if the identified language does not correspond to the identified context:
         replacing the entity by the meaning or a synonym thereof in the output content item corresponding to the input content item; or
   if the identified context is global:
      not replacing the entity in the output content item corresponding to the input content item; and
   generating for output, to the second user device, the output content item.

2. The method of claim 1, further comprising:
identifying a context of the input content item; and
wherein the weightage of the interpretation takes into account a correspondence between the context of the input content item and the context of the entity in the couple entity-meaning.

3. The method of claim 1, further comprising:
identifying a context of the output content item;
wherein the database includes meanings that are associated with the local context or the global context, such that each couple-entity meaning is associated with a context of the entity and a local or global context of the meaning; and
wherein the weightage of the interpretation takes into account a correspondence between the context of the output content item and the local or global context of the meaning in the couple entity-meaning.

4. The method of claim 1, further comprising:
identifying a context of the output content item; and
wherein the synonym is determined using the context of the output content item.

5. The method of claim 1, wherein computing the weightage further comprises taking into account a semantic meaning of the interpretation of the input content item.

6. The method of claim 1, further comprising:
generating a request for input, to the first user device and/or the second user device, about the accuracy of the output content item.

7. The method of claim 6, further comprising:
updating a relation between the entity and the meaning in the database upon receiving a confirmation of the accuracy, so that the weightage is increased when the interpretation uses that meaning for the entity.

8. The method of claim 1, wherein identifying the language associated with the second user device further comprises identifying a location of the second user device.

9. The method of claim 1, wherein the couple entity-meaning associated with a local context comprises a couple entity-meaning associated with a country.

10. The method of claim 1, wherein:
identifying that the context of the entity is local comprises identifying that the entity has a meaning that is confined to a country and/or region; and
identifying that the context of the entity is global comprises identifying that the entity has a meaning that is consistent in many countries and/or regions.

11. A computing device for converting an input content item into an output content item, the computing device comprising control circuitry configured to:
receive, from a first user device, the input content item;
identify at least one entity in the input content item;
retrieve from a database, for each entity, one or more meanings of the entity, wherein each couple entity-meaning is associated with a local context or a global context of the entity;
compute a weightage for each possible interpretation of the input content item, wherein the weightage takes into account a grammatical aspect of the interpretation, and wherein an interpretation of the input content item is the input content item in which each entity is replaced with one of the one or more meanings;
identify, based on the grammatical aspect, a threshold weightage,
identify, based on comparing the computed weightage to the threshold weightage, that the computed weightage is above the threshold weightage,
select the interpretation of the input content item based on the weightage;
identify, for each entity, whether the context is global or local;
if the identified context is local:
identify a language associated with a second user device;
determine whether the identified language corresponds to the identified local context; and
if the identified language corresponds to the identified context:
not replace the entity in the output content item corresponding to the input content item; or
if the identified language does not correspond to the identified context:
replace the entity by the meaning or a synonym thereof in the output content item corresponding to the input content item; or
if the identified context is global:
not replace the entity in the output content item corresponding to the input content item; and
generate for output, to the second user device, the output content item.

12. The computing device of claim 11, wherein the control circuitry is further configured to:
identify a context of the input content item; and
wherein the weightage of the interpretation takes into account a correspondence between the context of the input content item and the context of the entity in the couple entity-meaning.

13. The computing device of claim 11, wherein the control circuitry is further configured to:
identify a context of the output content item;
wherein the database includes meanings that are associated with the local context or the global context, such that each couple-entity meaning is associated with a context of the entity and a local or global context of the meaning; and
wherein the weightage of the interpretation takes into account a correspondence between the context of the output content item and the local or global context of the meaning in the couple entity-meaning.

14. The computing device of claim 11, wherein the control circuitry is further configured to:
identify a context of the output content item; and
wherein the synonym is determined using the context of the output content item.

15. The computing device of claim 11, wherein the control circuitry configured to compute the weightage is further configured to take into account a semantic meaning of the interpretation of the input content item.

16. The computing device of claim 11, wherein control circuitry is further configured to:
generate a request for input, to the first user device and/or the second user device, about the accuracy of the output content item.

17. The computing device of claim 16, wherein control circuitry is further configured to:
update a relation between the entity and the meaning in the database upon receiving a confirmation of the accuracy, so that the weightage is increased when the interpretation uses that meaning for the entity.

18. The computing device of claim 11, wherein the control circuitry configured to identify the language associated with the second user device is configured to identify the language by identifying a location of the second user device.

19. The computing device of claim 11, wherein the couple entity-meaning associated with a local context comprises a couple entity-meaning associated with a country.

20. The computing device of claim 11, wherein:
the control circuitry configured to identify that the context of the entity is local is configured to identify that the context is local by identifying that the entity has a meaning that is confined to a country and/or region; and
the control circuitry configured to identify that the context of the entity is global is configured to identify that the context is global by identifying that the entity has a meaning that is consistent in many countries and/or regions.

* * * * *